(12) United States Patent
Noguchi

(10) Patent No.: US 10,566,021 B2
(45) Date of Patent: Feb. 18, 2020

(54) IMAGE DISPLAY DEVICE AND LIGHT GUIDING DEVICE WITH DIFFRACTION ELEMENTS

(71) Applicant: SEIKO EPSON CORPORATION, Tokyo (JP)

(72) Inventor: Toshiyuki Noguchi, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 131 days.

(21) Appl. No.: 15/813,614

(22) Filed: Nov. 15, 2017

(65) Prior Publication Data

US 2018/0151194 A1 May 31, 2018

(30) Foreign Application Priority Data

Nov. 30, 2016 (JP) .................................. 2016-232194

(51) Int. Cl.
| | |
|---|---|
| *G02B 5/18* | (2006.01) |
| *G11B 7/1353* | (2012.01) |
| *G02B 27/01* | (2006.01) |
| *G02B 27/00* | (2006.01) |

(Continued)

(52) U.S. Cl.
CPC ........ *G11B 7/1353* (2013.01); *G02B 27/0043* (2013.01); *G02B 27/0103* (2013.01);
(Continued)

(58) Field of Classification Search
CPC ...... G02B 5/18; G02B 5/1814; G02B 5/1842; G02B 5/1861; G02B 5/32; G02B 27/01; G02B 27/0101; G02B 27/0103; G02B 2027/0105; G02B 2027/0107; G02B 2027/011; G02B 2027/0112; G02B 2027/0116; G02B 2027/013; G02B 2027/0132; G02B 2027/0145; G02B 27/017; G02B 27/0172; G02B 2027/0174; G02B 2027/0192; G02B 2027/0194;
(Continued)

(56) References Cited

U.S. PATENT DOCUMENTS 7,295,377 B2 * 11/2007 Edelmann ............ G02B 5/1814
345/8
9,885,877 B2 * 2/2018 Yonekubo .......... G02B 27/4227
(Continued)

FOREIGN PATENT DOCUMENTS

| JP | 4320713 B2 | 8/2009 |
|---|---|---|
| JP | 2010-033026 A | 2/2010 |

*Primary Examiner* — Arnel C Lavarias
(74) *Attorney, Agent, or Firm* — Oliff PLC

(57) ABSTRACT

An image display device includes an image light generation unit configured to generate image light, a projection system optical unit configured to project the image light, a correction system optical unit configured to correct aberrations, a first diffraction element configured to deflect the image light incident on a first incident surface, and a second diffraction element configured to deflect the image light incident on a second incident surface. The projection system optical unit, the second diffraction element, the correction system optical unit, and the first diffraction element are arranged in this order in a direction of the image light emitted from the image light generation unit, and the image light deflected and dispersed into rays of respective wavelengths by the second diffraction element is focused by the first diffraction element.

8 Claims, 11 Drawing Sheets

(51) Int. Cl.
  *G02B 27/42* (2006.01)
  *G11B 7/1372* (2012.01)
  *G11B 7/1392* (2012.01)
  *G11B 7/00* (2006.01)

(52) U.S. Cl.
  CPC ..... *G02B 27/0172* (2013.01); *G02B 27/4238* (2013.01); *G11B 7/1372* (2013.01); *G11B 7/1392* (2013.01); *G02B 27/4211* (2013.01); *G02B 27/4216* (2013.01); *G02B 2027/011* (2013.01); *G02B 2027/0116* (2013.01); *G02B 2027/0178* (2013.01); *G11B 2007/0003* (2013.01)

(58) Field of Classification Search
  CPC ............... G02B 27/10; G02B 27/1006; G02B 27/1066; G02B 27/1086; G02B 27/14; G02B 27/18; G02B 27/42; G02B 27/4205; G02B 27/4211; G02B 27/4272; G02B 27/4277; G02B 27/44
  USPC ......... 359/13, 14, 15, 16, 19, 558, 566, 569, 359/572, 576, 618, 629, 630, 633; 353/28
  See application file for complete search history.

(56) References Cited

U.S. PATENT DOCUMENTS

| | | | |
|---|---|---|---|
| 10,001,651 B2 * | 6/2018 | Noguchi | G02B 5/1842 |
| 10,001,655 B2 * | 6/2018 | Wakabayashi | G02B 27/4227 |
| 2019/0094546 A1 * | 3/2019 | Ide | G02B 27/0172 |

* cited by examiner

IMAGE DISPLAY DEVICE AND LIGHT GUIDING DEVICE WITH DIFFRACTION ELEMENTS

BACKGROUND

1. Technical Field

The present disclosure relates to an image display device and a light guiding device.

2. Related Art

Devices using a diffraction element such as a holographic element include hologram recording/reproducing devices, and image display devices that cause image light to be incident on a user's eye by a diffraction element. An example of image display devices includes a head mount display (HMD) or the like mounted on an observer's head to direct an image to an observer's eye. In such an HMD, a holographic element is disposed in front of the observer's eye and functions to deflect image light to the observer's eye. In the holographic element, interference fringes are optimized to obtain an optimum diffraction angle and diffraction efficiency at a specific wavelength.

For example, JP-A-2010-33026 discloses a HMD that uses a holographic element and proposes a display device having a configuration to guide image light by using a light guide plate and two diffraction elements to reduce color unevenness in the configuration of the HMD.

However, when the image light has a spectrum width around a specific wavelength, a ray having a wavelength shifted from the specific wavelength causes reduction in image resolution.

In the display device described in JP-A-2010-33026, a laser is used as a light source and color unevenness due to shift of rays having a wavelength of red (R), green (G), and blue (B) is taken into consideration. However, consideration is not given to a case where each color light has a spectrum width.

For example, when a light-emitting diode (LED) element, an organic electroluminescence device (OLED), or the like which has a spectrum width around a specific wavelength is used as a light source, a solution to the problem of a reduction in image resolution due to a ray having a wavelength shifted from a specific wavelength has not been disclosed or suggested.

FIG. 10 is a graph showing a spectrum width of image light from an LED, OLED, or the like.

In FIG. 10, the horizontal axis denotes wavelength, and the vertical axis denotes light intensity, and an exemplary wavelength distribution of image light L0 emitted from the OLED is illustrated. As shown in FIG. 10, the image light L0 has a wavelength distribution having a spectrum width around a wavelength of approximately 535 nm.

FIG. 11 is an explanatory diagram illustrating deflection, by a holographic element in front of an eye, of image light having a spectrum width.

FIG. 11 illustrates a portion of an image display device in front of an eye, and is a diagram illustrating a first diffraction element 61 constituted by a holographic element, an observer's eye E (pupil E1 and retina E2), a ray L1 (solid line) having a specific wavelength constituting the image light L0, a ray L2 (one-dot chain line) having a long wavelength relative to the ray L1 having a specific wavelength, and a ray L3 (dotted line) having a short wavelength relative to the ray L1 having a specific wavelength.

The image light L0 incident on the first diffraction element 61 is diffracted by the first diffraction element 61 and deflected in a direction of the observer's eye E. The image light L0 reaches the retina E2 through a pupil E1 of the eye E, enabling the observer to see an image.

An angle of diffraction by the first diffraction element 61 differs depending on the wavelength of incident light, and relative to the diffraction angle of the ray L1 having a specific wavelength, the ray L2 having a long wavelength has a large diffraction angle, and the ray L3 having a short wavelength has a small diffraction angle. Accordingly, as illustrated in FIG. 11, an angle of light diffracted by the first diffraction element 61 and deflected in the direction of the observer's eye E differs depending on the wavelength. As a result, the focal point on the retina E2 is shifted, resulting in reduced resolution.

SUMMARY

An advantage of some aspects of the embodiment is to provide an image display device and a light guiding device which can display an image with less reduction in resolution to enable preferable image display, even when image light has a spectrum width.

Application Example 1

An image display device according to the present application example includes an image light generation unit configured to generate and emit image light, a projection system optical unit configured to project the image light, a correction system optical unit configured to correct aberrations of the image light, a first diffraction element configured to deflect the image light incident on a first incident surface, and a second diffraction element configured to deflect the image light incident on a second incident surface. The projection system optical unit, the second diffraction element, the correction system optical unit, and the first diffraction element are arranged in this order in a direction of the image light emitted from the image light generation unit. The image light, which is incident on the second incident surface through the projection system optical unit and deflected and dispersed into rays of respective wavelengths by the second diffraction element, is incident on the first incident surface through the correction system optical unit and focused by being deflected by the first diffraction element.

According to the application example, image light generated by the image light generation unit is directed to an observer's eye, through the projection system optical unit, the second diffraction element, the correction system optical unit, and the first diffraction element, enabling an image to be observed. Here, the image light is dispersed (deflected) by the second diffraction element into rays of light with wavelengths having different diffraction angles, the rays are focused substantially in parallel by the first diffraction element and emitted to the observer's eye. Therefore, a shift in diffraction angle due to difference in wavelength can be compensated for, and thus, an image without deterioration in resolution can be provided. Furthermore, since the image light is incident on the second diffraction element through the projection system optical unit, the second diffraction element can have a preferable configuration according to a position in the direction in a plane of the second diffraction element.

Accordingly, an image display device which can display a preferable image can be provided.

Application Example 2

The first incident surface and the second incident surface according to the above application example preferably have a shape in which a center portion has a curved concave shape relative to a peripheral portion in an incident direction of the image light.

According to the present application example, the first incident surface and the second incident surface are formed into a shape in which a center portion has a recessed curved concave shape relative to a peripheral portion and have a function equivalent to that of a condenser lens. Therefore, a function of focusing the image light to an observer's eye is enhanced. Accordingly, high-quality image having a large angle of view can be effectively displayed.

Application Example 3

The first diffraction element and the second diffraction element according to any of the above application examples preferably include a reflective volume holographic element.

According to the present application example, the reflective volume holographic element can selectively diffract rays having the wavelengths only of the image light, and therefore a high transmissivity can be obtained, and the observer can visually confirm ambient light (background) and an image at the same time with the image display device.

Application Example 4

The first diffraction element and the second diffraction element according to any of the above application examples are preferably provided with plural kinds of interference fringes having different pitches.

According to the present application example, the plural kinds of interference fringes are provided corresponding to RGB colors of image light, and the image display device can effectively display a color image.

Application Example 5

The first diffraction element according to any of the above application examples is an element having a maximum diffraction efficiency in a first direction upon incidence of light in a direction normal to the first incident surface, the second diffraction element is an element having a maximum diffraction efficiency in a second direction upon incidence of light in a direction normal to the second incident surface, and when the sum of the number of reflections of light and the number of times of generating intermediate images between the second diffraction element and the first diffraction element is an even number, the first diffraction element and the second diffraction element are arranged to have the first direction relative to a direction normal to the first incident surface and the second direction relative to a direction normal to the second incident surface which are oriented in the same direction, as viewed in a direction normal to an imaginary plane including a line normal to the first incident surface and a line normal to the second incident surface, and when the sum of the number of reflections of light and the number of times of generating intermediate images between the second diffraction element and the first diffraction element is an odd number, the first diffraction element and the second diffraction element are arranged to have the first direction relative to a direction normal to the first incident surface and the second direction relative to a direction normal to the second incident surface which are oriented in different directions, as viewed in a direction normal to an imaginary plane including the line normal to the first incident surface and the line normal to the second incident surface.

According to the present application example, when an optical element is disposed between the first diffraction element and the second diffraction element, a shift in the diffraction angle which is different for each wavelength can be effectively compensated for.

Application Example 6

The image light generation unit according to any of the application examples preferably includes an organic electroluminescence display element.

According to the present application example, the organic electroluminescence display element which is small and has a high resolution is employed, and an image display device which is small and displays a high-quality image can be provided.

Application Example 7

The image light generation unit according to any of the application examples preferably includes an illumination light source and a liquid crystal display element.

According to the present application example, the illumination light source can be selected, and the degree of freedom in wavelength characteristics of image light can be effectively increased.

Application Example 8

A light guiding device according to the present application example includes a projection system optical unit configured to project image light, a correction system optical unit configured to correct aberrations of the image light, a first diffraction element configured to deflect the image light incident on a first incident surface, and a second diffraction element configured to deflect the image light incident on a second incident surface, in which the projection system optical unit, the second diffraction element, the correction system optical unit, and the first diffraction element are arranged in this order in a direction of the image light emitted from an image light generation unit, and the image light, which is incident on the second incident surface through the projection system optical unit and deflected and dispersed into rays of respective wavelengths by the second diffraction element, is incident on the first incident surface through the correction system optical unit, and focused by being deflected by the first diffraction element.

According to the application example, image light is directed to an observer's eye through the projection system optical unit, the second diffraction element, the correction system optical unit, and the first diffraction element, enabling an image to be observed. Here, the image light is dispersed (deflected) into rays of light with wavelengths having different diffraction angles by the second diffraction element, the rays are focused substantially in parallel by the first diffraction element, and emitted to the observer's eye. Therefore, a shift in the diffraction angles due to difference in wavelength can be compensated for, and thus, an image without deterioration in resolution can be provided. Furthermore, the correction system optical unit is disposed, and aberrations such as distortion can be reduced.

Accordingly, a light guiding device which can display a preferable image can be provided.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, embodiments will be described with reference to the drawings. Note that in the following drawings, the scale and angle of each layer and member are different from those of actual layers and members so that the size of each layer and member can be visually recognizable.

Embodiment 1

Figure 1:
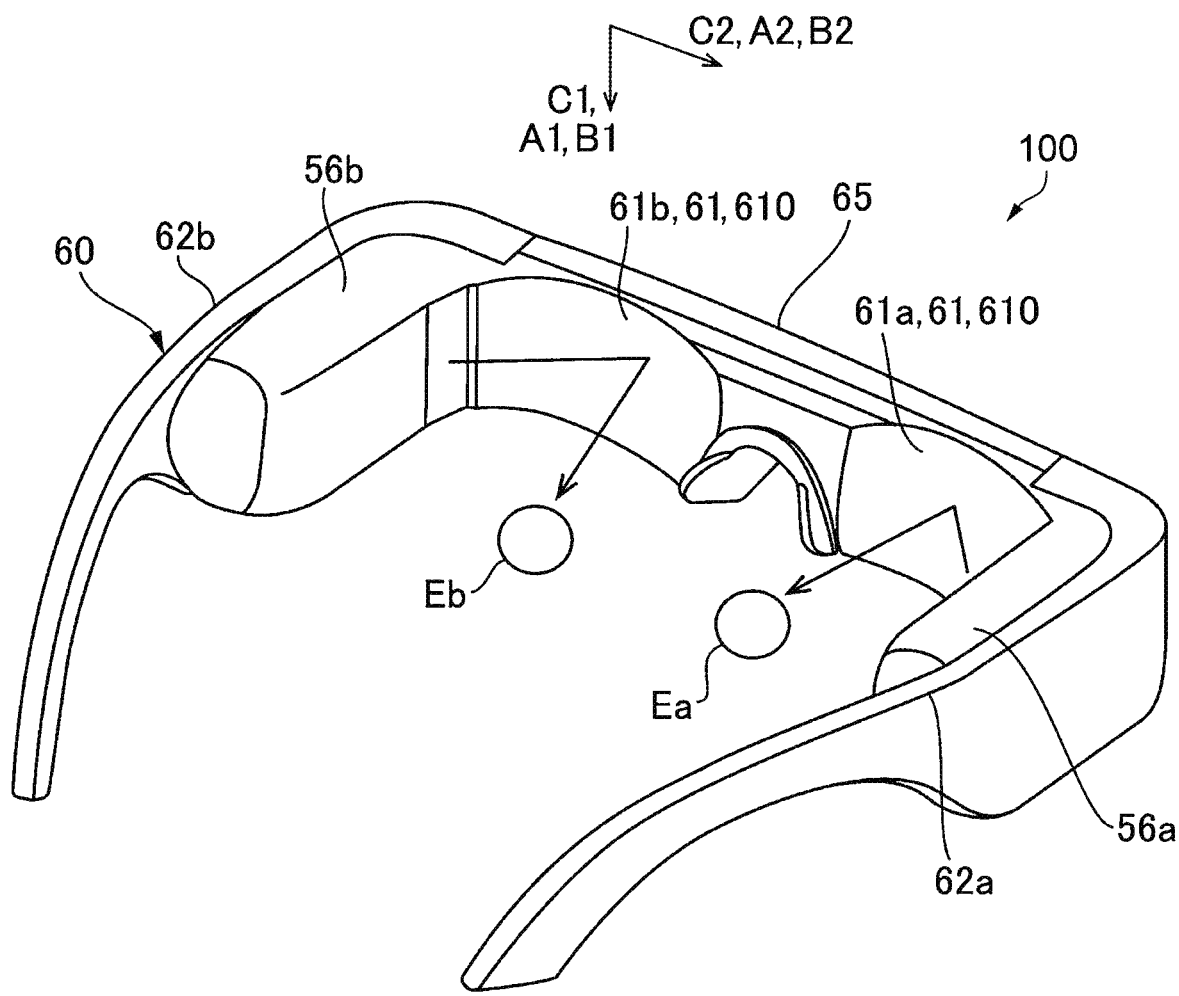
FIG. 1 is an external view illustrating an aspect of appearance of an image display device to which the embodiment is applied.

FIG. 1 is an external view illustrating an aspect of appearance of an image display device 100 to which the embodiment is applied.

In FIG. 1, the image display device 100 is a head-mount image display device and includes a right eye image light generation unit 56a, a right eye deflection member 61a configured to deflect image light emitted from the right eye image light generation unit 56a and make the image light incident on an observer's right eye Ea, a left eye image light generation unit 56b, and a left eye deflection member 61b configured to deflect the image light emitted from the left eye image light generation unit 56b and make the image light incident on an observer's left eye Eb. For example, the image display device 100 has a form resembling eyeglasses. Specifically, the image display device 100 includes a frame 60 configured to hold the right eye image light generation unit 56a, the right eye deflection member 61a, the left eye image light generation unit 56b, and the left eye deflection member 61b, and the frame 60 is mounted on an observer's head. The frame 60 has a front portion 65 configured to support the right eye deflection member 61a and the left eye deflection member 61b, and the right eye image light generation unit 56a is provided at a right temple 62a of the frame 60 and the left eye image light generation unit 56b is provided at a left temple 62b of the frame 60. The right eye deflection member 61a and the left eye deflection member 61b are each provided with a first diffraction element 61, which is described later.

Figure 2:
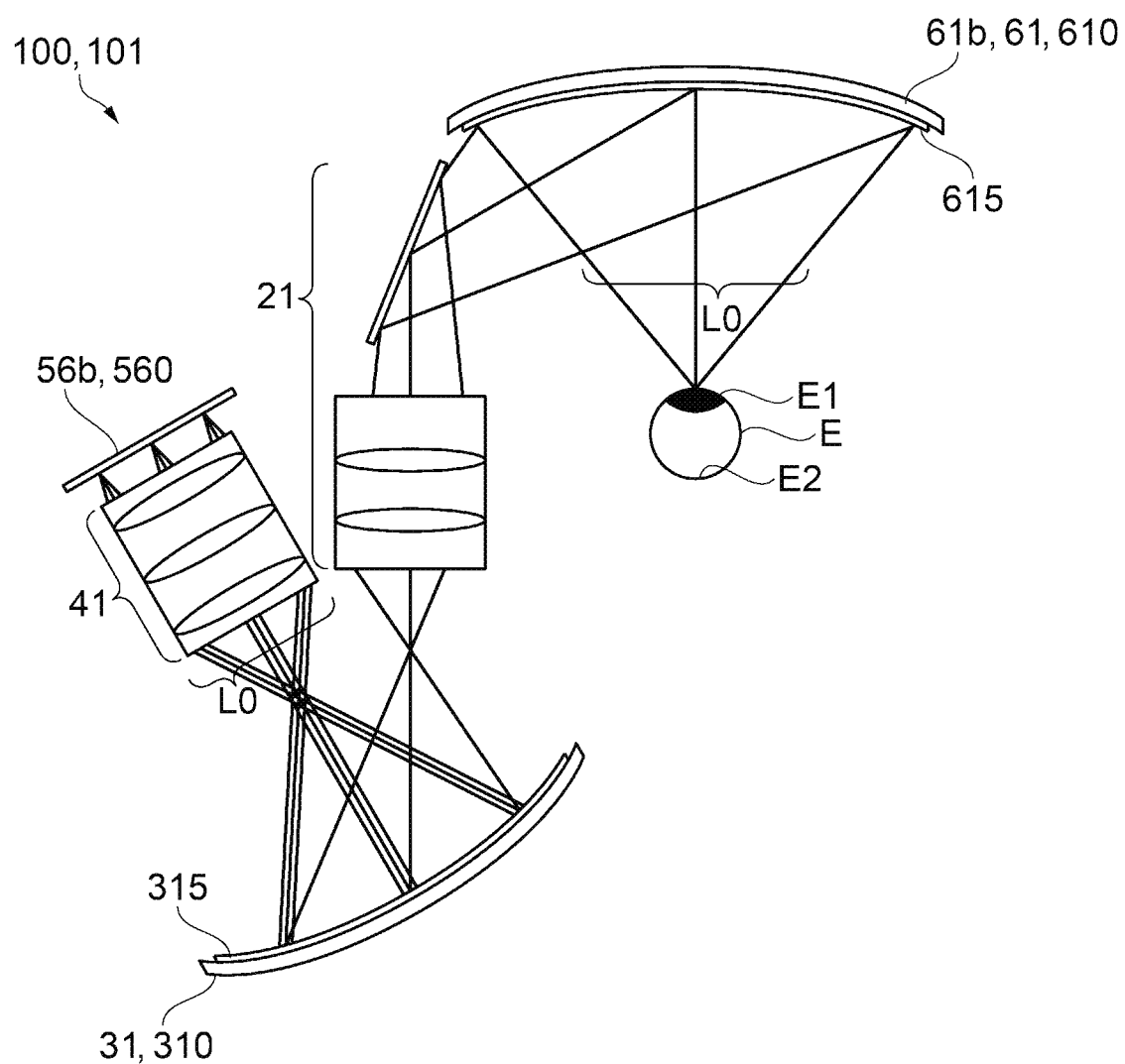
FIG. 2 is an explanatory diagram illustrating an aspect of an optical system of an image display device to which the embodiment is applied.

FIG. 2 is an explanatory diagram illustrating an aspect of an optical system of the image display device 100 to which the embodiment is applied.

The right eye image light generation unit 56a and the left eye image light generation unit 56b have the same basic configuration, and therefore in FIG. 2, only a configuration of the left eye image light generation unit 56b will be illustrated, and illustration of the right eye image light generation unit 56a will be omitted.

As illustrated in FIG. 2, in Embodiment 1, a projection system optical unit 41, a second diffraction element 31, a correction system optical unit 21, and the first diffraction element 61 are sequentially arranged, in a direction of image light emitted from the left eye image light generation unit 56b. Here, in FIG. 2, the projection system optical unit 41, the second diffraction element 31, the correction system optical unit 21, and the first diffraction element 61 constitute a light guiding device 101 forming an optical path of the image light.

FIG. 2 illustrates rays of the image light passing through the center and the opposite ends of the angle of view. Note that after the rays are deflected by the second diffraction element 31, only the center ray of each of the respective rays of the image light passing through the center and opposite ends of the angle of view is described and other rays are omitted, for ease of illustration.

Image light L0 generated by the left eye image light generation unit 56b is incident on a second incident surface 315 of the second diffraction element 31 through (via) the projection system optical unit 41. The image light L0 incident on the second diffraction element 31 is diffracted and deflected by the second diffraction element 31. The image light L0 deflected by the second diffraction element 31 is incident on a first incident surface 615 of the first diffraction element 61 through the correction system optical unit 21. The image light L0 incident on the first diffraction element 61 is diffracted and deflected by the first diffraction element 61. Then the image light L0 reaches a retina E2, through a pupil E1 of an eye E, enabling the observer to see an image.

The left eye image light generation unit 56b includes an OLED 560 to generate image light L0. Note that the left eye image light generation unit 56b may include an illumination light source (LED or the like) and a liquid crystal display element.

The projection system optical unit 41 includes an optical element such as a lens or a mirror. The projection system optical unit 41 has a function of controlling the emission angle of the image light L0, and adjusts the image light L0 generated by the left eye image light generation unit 56b to form bundles of parallel rays in which each bundle of rays has an angle in accordance with a position where the bundle of rays is generated. Thus, the image light L0 generated by the left eye image light generation unit 56b can be efficiently directed to the second diffraction element 31.

The correction system optical unit 21 includes an optical element such as a lens or a mirror. The correction system optical unit 21 has a function of correcting aberrations, such as distortion, of the image light L0. Thus, the image light L0 deflected by the second diffraction element 31 can be efficiently directed to the first diffraction element 61.

Configurations of First Diffraction Element 61 and Second Diffraction Element 31

In Embodiment 1, the left eye deflection member 61b is provided with the first diffraction element 61 including a reflective volume holographic element 610. The reflective volume holographic element 610 is a partially reflective diffractive optical element, and the left eye deflection member 61b is a partially transmissive reflective combiner. Therefore, ambient light also enters the eye E through the left eye deflection member 61b (combiner), and the observer can recognize an image in which the image light L0 generated by the left eye image light generation unit 56b, and the ambient light (background) are superimposed on each other. Here, the first diffraction element 61 has a concave surface facing the observer so that the first incident surface 615 of the first diffraction element 61 on which the image light L0 is incident is concave in a direction away from the eye E. In other words, the first incident surface 615 has a shape having a concave center portion curved relative to a peripheral portion, in an incident direction of the image light L0. Therefore, the image light L0 can be efficiently focused toward the observer's eye E.

Furthermore, the second diffraction element 31 is provided with a reflective volume holographic element 310. The reflective volume holographic element 310 is a partially reflective diffractive optical element. Here, the second diffraction element 31 has a concave surface facing the correction system optical unit 21 so that the second incident surface 315 of the second diffraction element 31 on which the image light L0 is incident is concaved. In other words, the second incident surface 315 has a shape having a concave center portion curved relative to a peripheral portion, in the incident direction of the image light L0. Therefore, the image light L0 can be efficiently deflected toward the correction system optical unit 21.

The first diffraction element 61 and the second diffraction element 31 have the same basic configuration. Therefore, only a configuration of the first diffraction element 61 will be described here, and description of the second diffraction element 31 will be omitted.

Figure 3:
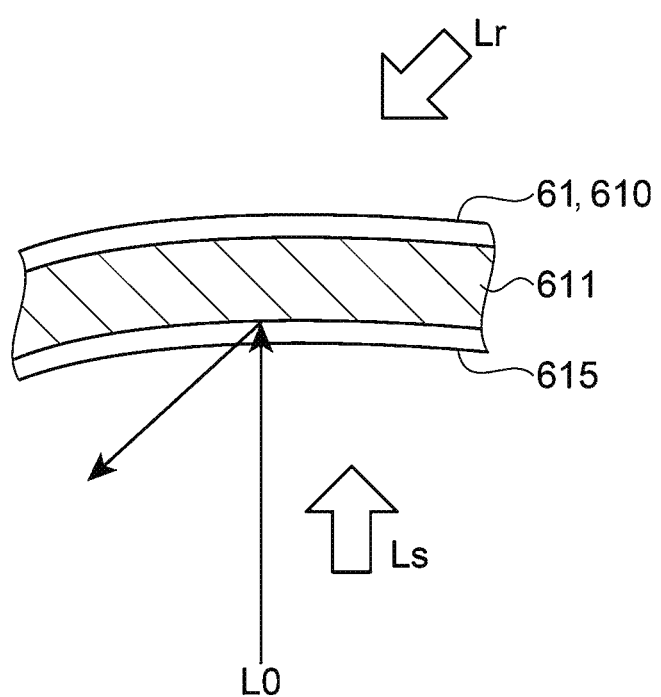
FIG. 3 is a sectional view illustrating an aspect of a structure of a first diffraction element and a second diffraction element.

FIG. 3 is a sectional view illustrating the structure of the first diffraction element 61. The first diffraction element 61 diffracts and deflects the image light L0 in a predetermined direction. As schematically illustrated in FIG. 3, the first diffraction element 61 has interference fringes 611 having a pitch corresponding to a specific wavelength. The interference fringes 611 are recorded, as a difference in refractive index or the like, in a hologram photosensitive layer, and the interference fringes 611 are inclined in one direction, relative to the first incident surface 615 of the first diffraction element 61 and corresponding to a specific incidence angle. Here, the specific wavelength and the specific incidence angle correspond to a wavelength and an incidence angle of the image light L0. The interference fringes 611 having such a configuration can be formed by performing interference exposure on a holographic photosensitive layer by using a reference beam Lr and an object beam Ls.

The configuration of the image display device 100 according to Embodiment 1 has been described above. Next, a reason why decrease in image resolution is suppressed by the image display device 100 when the image light L0 has a spectrum width will be described.

Figure 4:
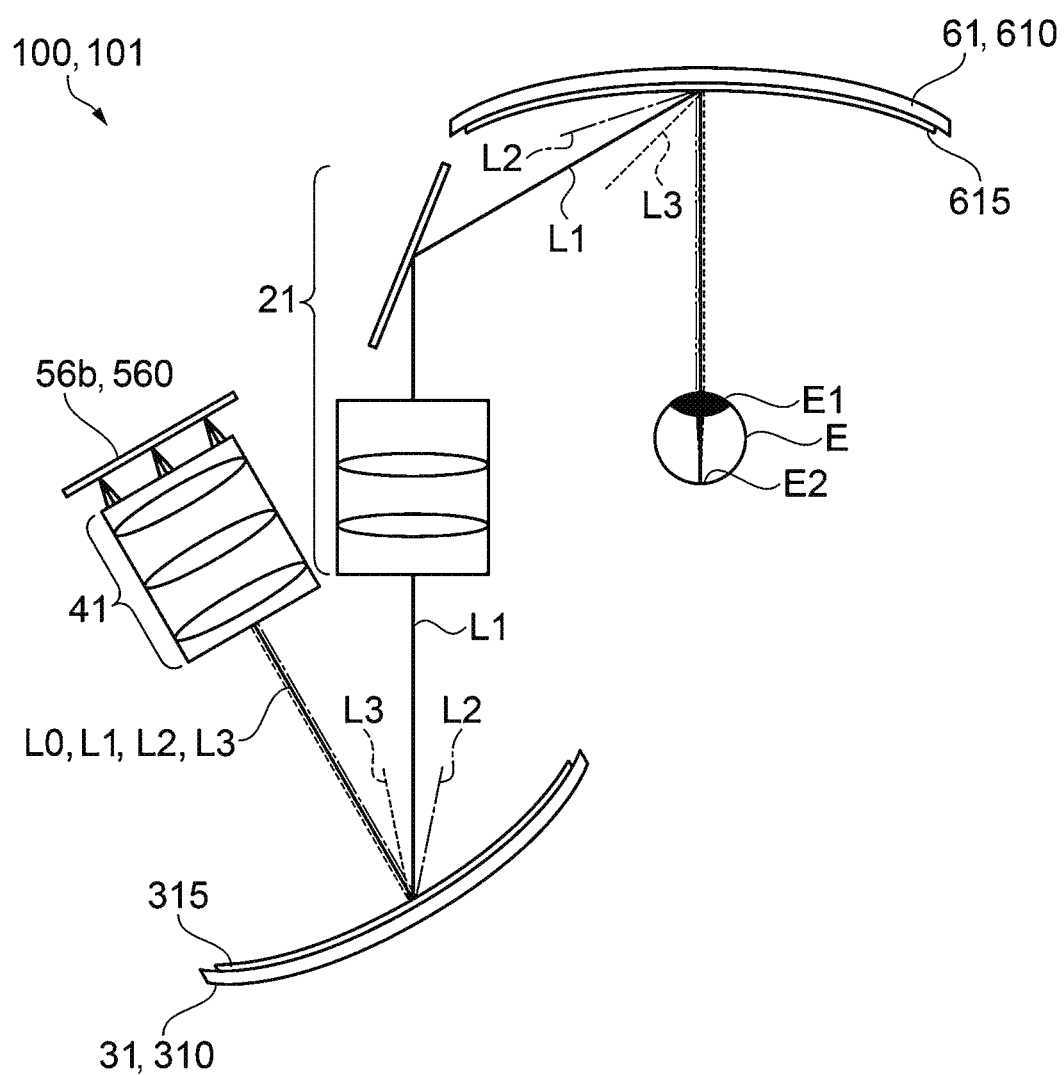
FIG. 4 is an explanatory diagram illustrating a function obtained by an image display device to which the embodiment is applied.
Figure 10:
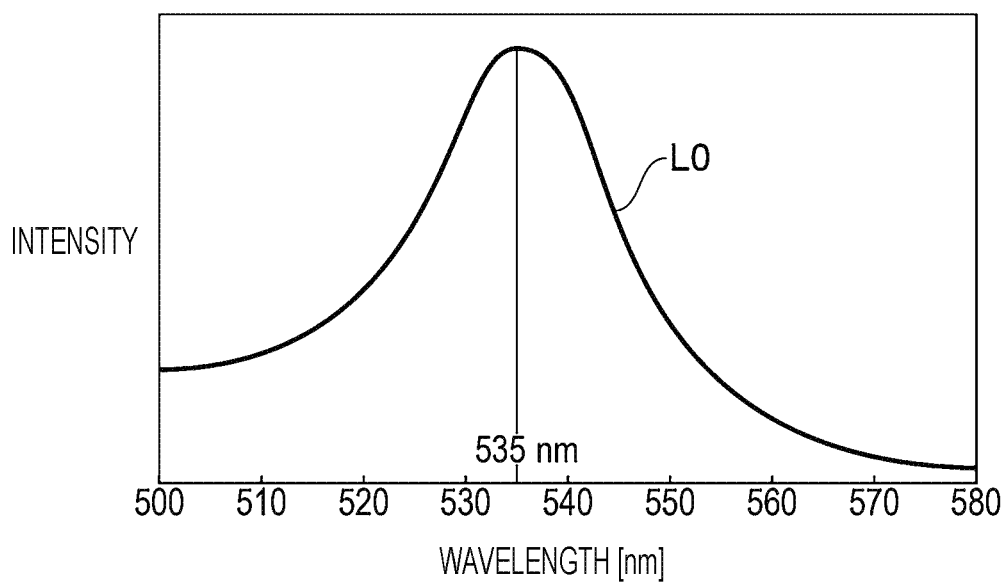
FIG. 10 is a graph illustrating an exemplary wavelength distribution of image light having a spectrum width.

FIG. 4 is an explanatory diagram illustrating a function obtained by the image display device according to Embodiment 1. Note that, only a ray at the center of an angle of view is shown and an effect thereof is described, but the other rays in the angle of view have similar effects, and description thereof is omitted. FIG. 4 illustrates a ray L1 (solid line) having a specific wavelength of the image light L0, which is, for example, a ray having a wavelength of an intensity peak of the image light L0 (e.g., 535 nm in FIG. 10). Furthermore, FIG. 4 illustrates a ray L2 (one-dot chain line) having a long wavelength relative to the specific wavelength, and a ray L3 (dotted line) having a short wavelength relative to the specific wavelength. Note that, from the second diffraction element 31 to the first diffraction element 61, only the ray L1 having a specific wavelength is illustrated, for simplification of FIG. 4.

The image light L0 incident on the second diffraction element 31 is diffracted and deflected by the second diffraction element 31. At this time, the ray L2 having a long wavelength relative to the specific wavelength has a diffraction angle larger than a diffraction angle of the ray L1 having a specific wavelength. Furthermore, the ray L3 having a short wavelength relative to the specific wavelength has a diffraction angle smaller than the diffraction angle of the ray L1 having a specific wavelength.

Thus, the image light L0 emitted from the second diffraction element 31 is deflected and dispersed into rays of respective wavelengths.

The image light L0 emitted from the second diffraction element 31 is incident on the first diffraction element 61 through the correction system optical unit 21 and is diffracted and deflected by the first diffraction element 61. When an angle between the image light L0 and a line normal to the incident surface of the first diffraction element 61 is defined as an incidence angle, the ray L2 having a long wavelength relative to the specific wavelength has an incidence angle larger than that of the ray L1 having a specific wavelength, and the ray L3 having a short wavelength relative to the specific wavelength has an incidence angle smaller than that of the ray L1 having a specific wavelength.

At this time, the ray L2 having a long wavelength relative to the specific wavelength has a diffraction angle larger than a diffraction angle of the ray L1 having a specific wavelength. Furthermore, the ray L3 having a short wavelength relative to the specific wavelength has a diffraction angle smaller than the diffraction angle of the ray L1 having a specific wavelength.

The ray L2 having a long wavelength relative to the specific wavelength is incident on the first diffraction element 61 at an incidence angle larger than that of the ray L1 having a specific wavelength, but the ray L2 having a long wavelength relative to the specific wavelength has a diffraction angle larger than the diffraction angle of the ray L1 having a specific wavelength, and thus, the ray L2 having a long wavelength relative to the specific wavelength and the ray L1 having a specific wavelength are substantially parallel to each other, upon emission from the first diffraction element 61.

Similarly, the ray L3 having a short wavelength relative to the specific wavelength is incident on the first diffraction element 61 at an incidence angle smaller than that of the ray L1 having a specific wavelength, but the ray L3 having a short wavelength relative to the specific wavelength has a diffraction angle smaller than the diffraction angle of the ray L1 having a specific wavelength, and thus, the ray L3 having a short wavelength relative to the specific wavelength and the ray L1 having a specific wavelength are substantially parallel to each other, upon emission from the first diffraction element 61.

Accordingly, the image light L0 emitted from the first diffraction element 61 is focused to enter the observer's eye as substantially parallel rays. Thus, a shift in focal point on the retina is reduced for each wavelength.

Here, the first diffraction element 61 and the second diffraction element 31 are preferably formed to compensate for a shift in diffraction angle due to difference in wavelength.

For example, when the first diffraction element 61 and the second diffraction element 31 are formed so that the pitches and inclinations of the interference fringes 611 and interference fringes 311 are equal to each other in the direction in a plane, the shift in diffraction angle due to difference in wavelength can be compensated for. However, considering an influence of an optical component disposed between the first diffraction element 61 and the second diffraction element 31, a mode in which the interference fringes 611 and 311 have different pitches and inclinations in the direction in a plane may be sometimes preferable. In such a case, the interference fringes 611 and 311 are formed to have slightly different pitches and inclinations considering the influence of the optical component so that the image light L0 emitted from the first diffraction element 61 is focused. In any configuration, the image light L0 incident on the second diffraction element 31 is adjusted through the projection system optical unit 41 into bundles of parallel rays in which each of the bundles has an angle according to a position where the bundle is generated, and thus, the pitches and inclinations of the interference fringes 311 can be preferably configured to compensate for the shift in diffraction angle due to difference in wavelength of each bundle in accordance with the position in the direction in a plane of the second diffraction element 31.

Functions and Effects

As described above, in the image display device 100 according to Embodiment 1, the image light L0 having a spectrum width is deflected and dispersed into rays of respective wavelengths by the second diffraction element 31, is focused by the first diffraction element 61, and then enters the observer's eye as substantially parallel rays. Therefore, the shift in focal point on the retina E2 is reduced, and image can be displayed with less reduction in resolution.

Furthermore, the correction system optical unit 21 can have the function of correcting aberrations such as distortion of the image light L0 and thus the image display device 100 capable of displaying a preferable image having less aberrations such as distortion can be provided.

Figure 5A:
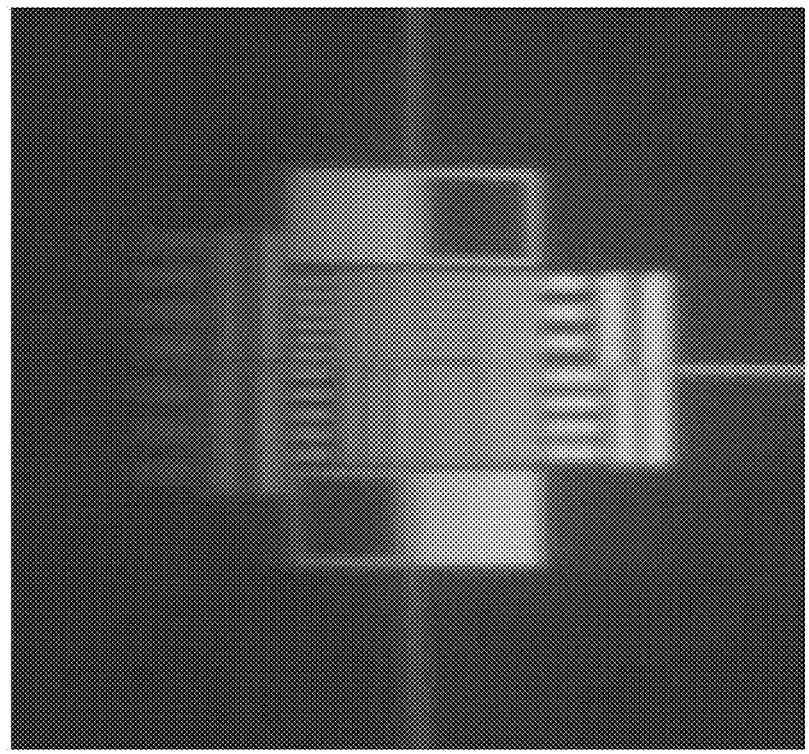
FIG. 5A is a photograph for describing an effect of the embodiment.
Figure 5B:
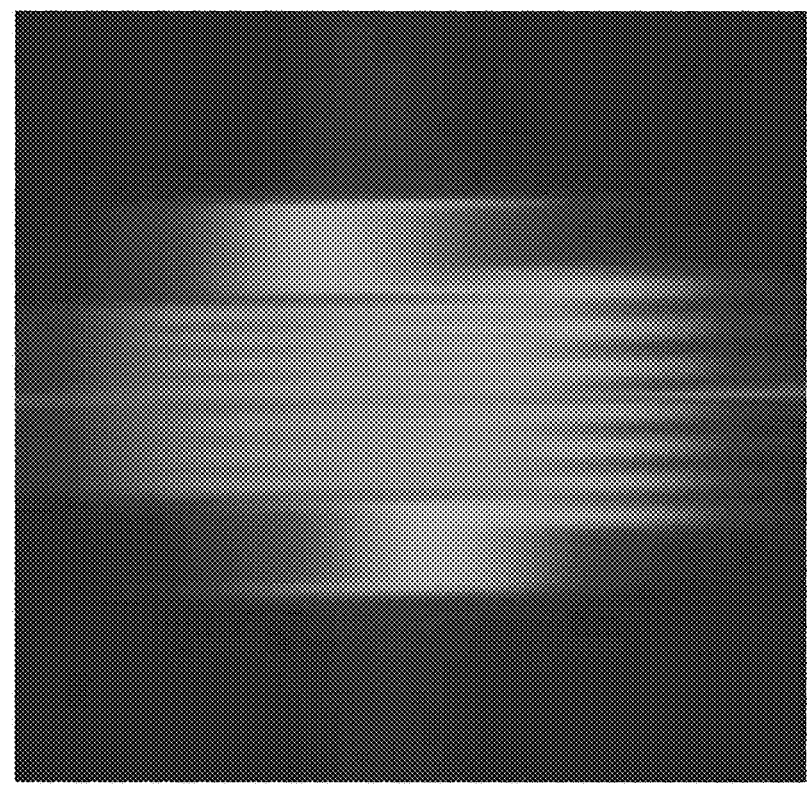
FIG. 5B is a photograph for describing an effect of the embodiment.
Figure 11:
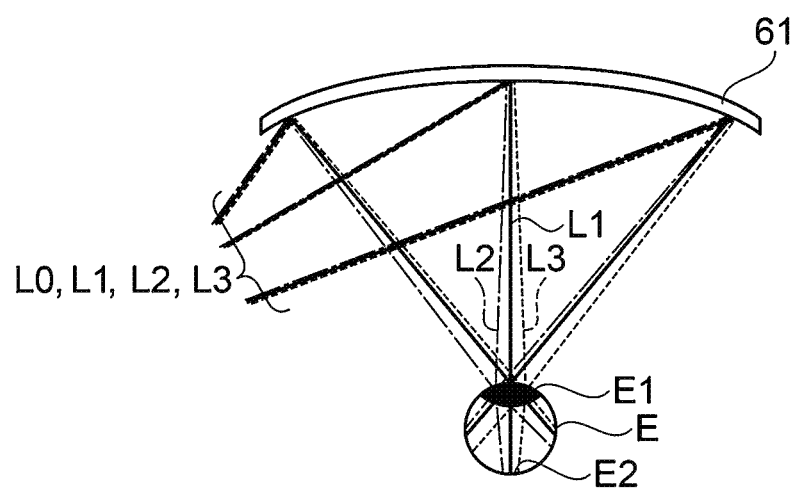
FIG. 11 is an explanatory diagram illustrating deflection of image light having a spectrum width by a holographic element.

FIGS. 5A and 5B are photographs for describing effects of inhibiting reduction in resolution according to Embodiment 1. FIG. 5A shows a display image according to Embodiment 1, viewed from a position of an observer's eye, and FIG. 5B shows a display image viewed from a position of the observer's eye, where Embodiment 1 is not applied (e.g., according to conditions illustrated in FIG. 11). By application of the embodiment, a display image having a reduced resolution due to a shift in diffraction angle according to difference in the wavelength as shown in FIG. 5B is changed to a preferable display image with less reduction in resolution as shown in FIG. 5A.

Note that, the embodiment is not limited to the above Embodiment 1, and various changes or modifications may be made to Embodiment 1. Hereinafter modifications will be described.

Modification 1

In Modification 1, one mode of the first diffraction element 61 and the second diffraction element 31 will be described where image light represents a color image. Note that, the same constituents as those of Embodiment 1 are denoted by the same reference numerals, and repeated description thereof will be omitted. Furthermore, as in Embodiment 1, the first diffraction element 61 and the second diffraction element 31 have the same basic configuration, and therefore only a configuration of the first diffraction element 61 will be described here, and description of the second diffraction element 31 will be omitted.

Figure 6:
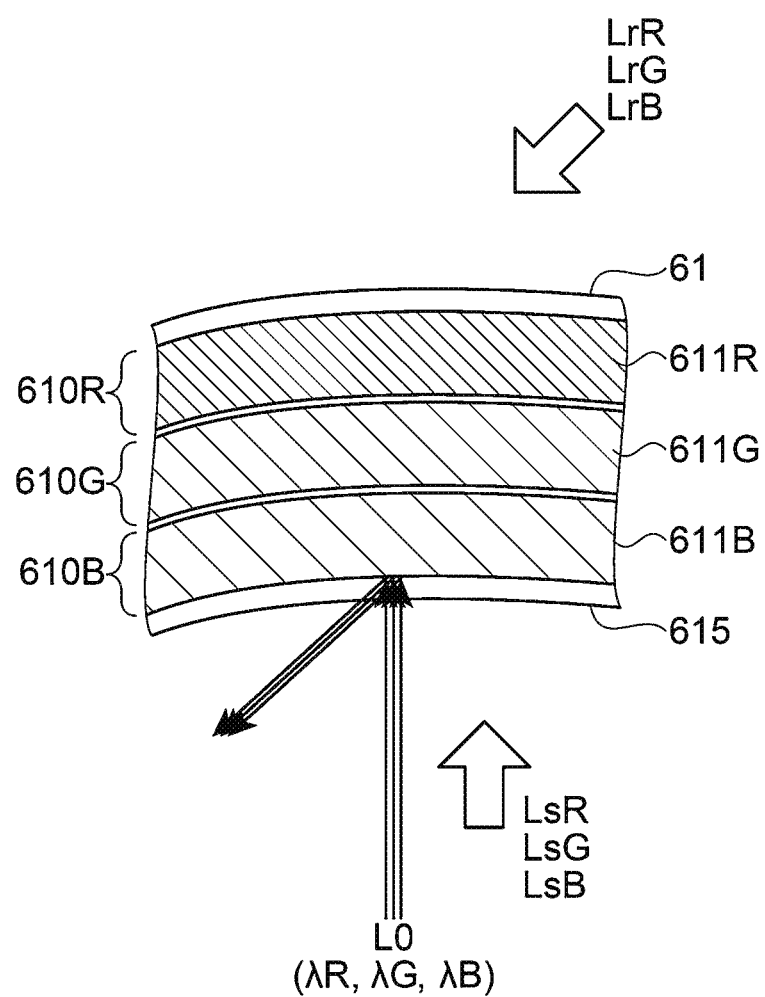
FIG. 6 is a sectional view illustrating another aspect of a structure of a first diffraction element and a second diffraction element.

FIG. 6 is a sectional view illustrating the first diffraction element 61 according to Modification 1. In Modification 1, the first diffraction element 61 includes reflective volume holographic elements 610R, 610G, and 610B which are stacked one on another, and the reflective volume holographic elements 610R, 610G, and 610B have interference fringes 611R, 611G, and 611B, respectively.

Figure 7:
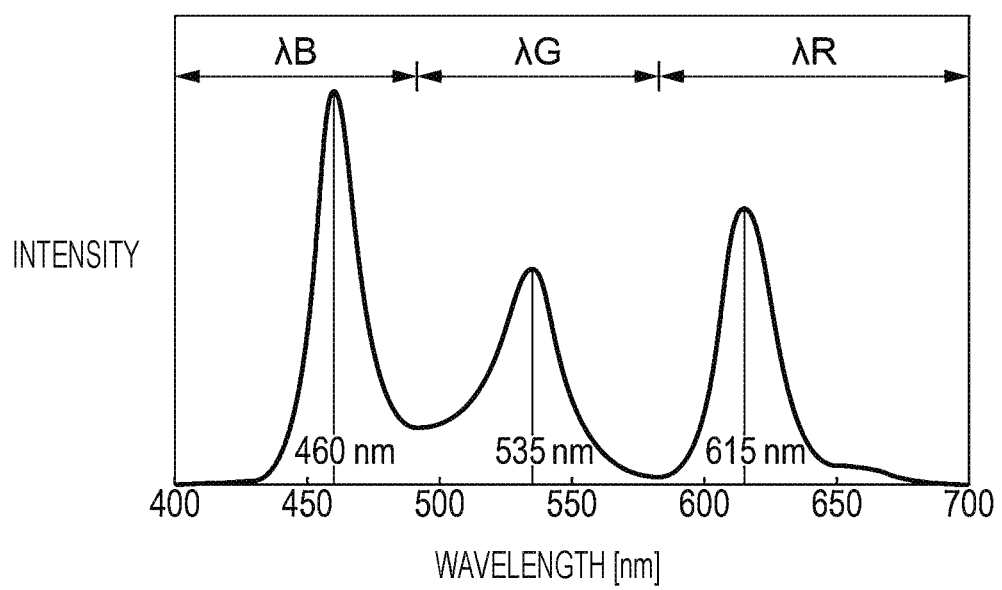
FIG. 7 is a graph illustrating an exemplary wavelength distribution where image light represents a color image.

FIG. 7 is a graph illustrating an exemplary wavelength distribution where image light L0 represents a color image, and the image light L0 has light intensities in a plurality of wavelength ranges. As illustrated in FIG. 7, since the image light L0 represents a color image, the image light L0 has light intensity peaks in wavelength ranges corresponding to colors of a red light region ($\lambda R$), a green light region ($\lambda G$), and a blue light region ($\lambda B$). Here, $\lambda R$ is a wavelength in a range of 400 nm to 500 nm, $\lambda G$ is a wavelength in a range of 500 nm to 580 nm, and $\lambda B$ is a wavelength in a range of 580 nm to 700 nm.

The interference fringes 611R, 611G, and 611B each have a pitch corresponding to the light intensity peak (e.g., 615 nm, 535 nm, or 460 nm in FIG. 7) in respective wavelength ranges of $\lambda R$, $\lambda G$, and $\lambda B$ constituting the image light L0. The interference fringes 611R, 611G, and 611B are recorded, as a difference in refractive index or the like, in a hologram photosensitive layer and the interference fringes 611R, 611G, and 611B are inclined in one direction, relative to the incident surface of the first diffraction element 61 so that the image light is diffracted according to the incidence angle. The interference fringes 611R, 611G, and 611B having such a configuration can be formed by performing interference exposure on a holographic photosensitive layer by using reference beams LrR, LrG, and LrB, and object beams LsR, LsG, and LsB, and then stacking the reflective volume holographic elements.

Functions and Effects

As described above, according to Modification 1, the following functions and effects can be obtained in addition to the effects in Embodiment 1.

The first diffraction element 61 has the interference fringes 611R, 611G, and 611B corresponding to the respective wavelengths of light having a wavelength of $\lambda R$, light having a wavelength of $\lambda G$, and light having a wavelength of $\lambda B$ which constitute the image light L0, and a function of deflecting the light having a wavelength of $\lambda R$, the light having a wavelength of $\lambda G$, and the light having a wavelength of $\lambda B$ which constitute the image light L0 can be obtained. Accordingly, the observer can effectively see a color image.

Note that, as illustrated in FIG. 7, each of the light having a wavelength of $\lambda R$, light having a wavelength of $\lambda G$, and light having a wavelength of $\lambda B$ has a spectrum width, but the functions and effects described in Embodiment 1 can be similarly obtained. That is, image display with less reduction in resolution can be effectively obtained with the functions of deflecting and dispersing the image light L0 having a spectrum width by the second diffraction element 31 into rays of respective wavelengths, focusing the image light L0 by the first diffraction element 61, and causing the image light L0, as substantially parallel rays, to enter the observer's eye.

Modification 2

In Modification 2, another mode of the first diffraction element 61 and the second diffraction element 31 will be described where image light represents a color image. Note that, the same constituents as those of Embodiment 1 are denoted by the same reference numerals, and repeated description thereof will be omitted. Furthermore, as in Embodiment 1, the first diffraction element 61 and the second diffraction element 31 have the same basic configuration, and therefore only a configuration of the first diffraction element 61 will be described here, and description of the second diffraction element 31 will be omitted.

Figure 8:
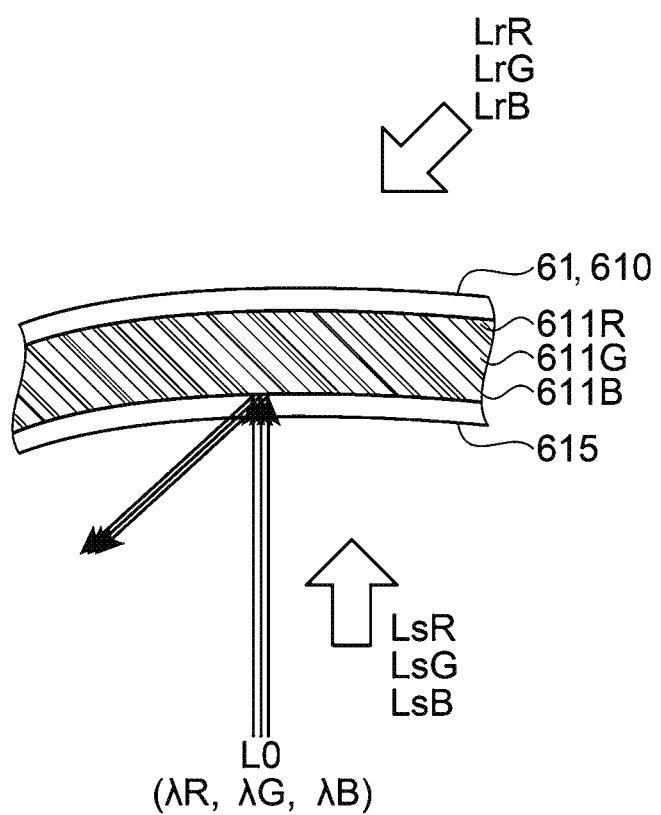
FIG. 8 is a sectional view illustrating still another aspect of a structure of a first diffraction element and a second diffraction element.

FIG. 8 is a sectional view illustrating the first diffraction element 61 according to Modification 2. In Modification 2, the first diffraction element 61 includes the reflective volume holographic element 610, and has a configuration in which the interference fringes 611R, 611G, and 611B are superimposed on one another.

As in Modification 1, each of the interference fringes 611R, 611G, and 611B has a pitch and an inclination corresponding to the image light L0, and is recorded as a difference in refractive index or the like in a hologram photosensitive layer. The interference fringes 611R, 611G, and 611B having such a configuration can be formed by performing simultaneous interference exposure on a holographic photosensitive layer by using reference beams LrR, LrG, and LrB and object beams LsR, LsG, and LsB.

Functions and Effects

According to Modification 2, the following functions and effects can be obtained in addition to the effects in Modification 1 and Embodiment 1.

That is, the first diffraction element 61 has the interference fringes 611R, 611G, and 611B corresponding to the respective wavelengths of the light having a wavelength of λR, the light having a wavelength of λG, and the light having a wavelength of λB which constitute the image light L0, and a function of deflecting the light having a wavelength of λR, the light having a wavelength of λG, and the light having a wavelength of λB which constitute the image light L0 can be obtained, enabling color image display as in Modification 1.

Furthermore, the image light L0 having a spectrum width is deflected and dispersed into rays of respective wavelengths by the second diffraction element 31, is focused for each wavelength by the first diffraction element 61, and then enters the observer's eye as substantially parallel rays. Accordingly, as in Embodiment 1, image display with less reduction in resolution can be effectively obtained.

In Modification 2, in addition to the effects described above, the interference fringes 611R, 611G, and 611B are configured to be superimposed, and the reflective volume holographic element 610 does not need to have a stacked configuration, thus enabling color image display having a reduced number of components in comparison with that in Modification 1.

Modification 3

When the image display device 100 according to the embodiment is configured, an optical element such as a mirror or a lens may be added or removed depending on a display performance, a size, design, or the like. In Modification 3, one mode of arrangement of the first diffraction element 61 and the second diffraction element 31 will be described regarding a case where an optical element such as a mirror or a lens is added or reduced as compared to Embodiment 1.

Figure 9:
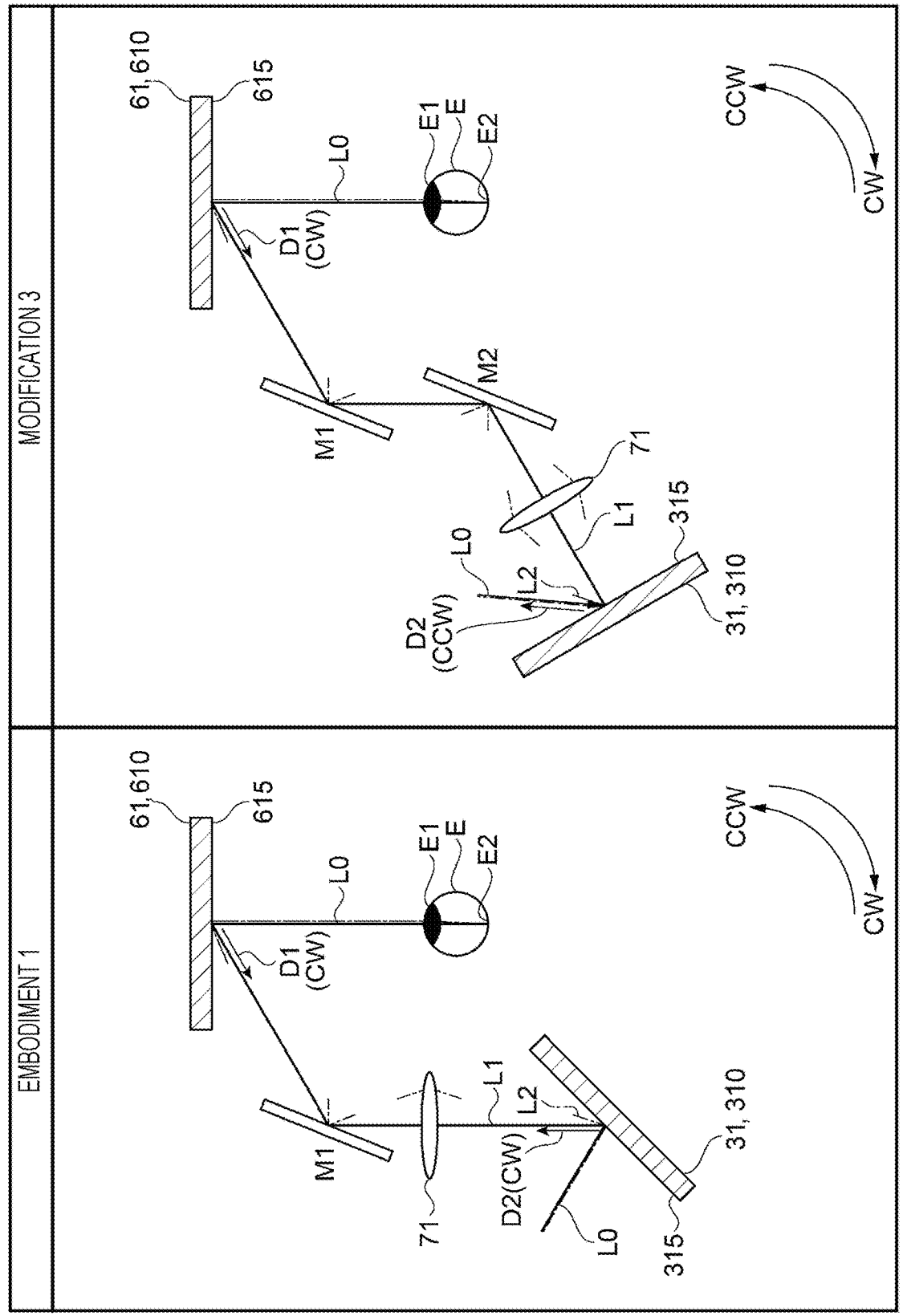
FIG. 9 is an explanatory diagram illustrating arrangements of a first diffraction element and a second diffraction element.

FIG. 9 illustrates arrangements of the first diffraction element 61 and the second diffraction element 31 according to Embodiment 1 and Modification 3. Note that, for description of arrangements of the first diffraction element 61 and the second diffraction element 31, constituents are omitted or deformed in FIG. 9. Specifically, the left eye image light generation unit 56b, the projection system optical unit 41, and the correction system optical unit 21 are omitted, and the first diffraction element 61 and the second diffraction element 31 are illustrated in a plane. Here, generation of an intermediate image generated between the first diffraction element 61 and the second diffraction element 31 is represented by an intermediate image generation lens 71, and reflection in the correction system optical unit 21 is represented by a mirror M1 and a mirror M2. Modification 3 describes arrangement where the mirror M2 is added between the first diffraction element 61 and the second diffraction element 31 in comparison with Embodiment 1.

Here, a direction in which a diffraction efficiency is maximum upon incidence of light in a direction normal to the first incident surface 615 of the first diffraction element 61 is defined as a first direction D1, and a direction in which a diffraction efficiency is maximum upon incidence of light in a direction normal to the second incident surface 315 of the second diffraction element 31 is defined as a second direction D2.

In Embodiment 1, the first diffraction element 61 and the second diffraction element 31 are arranged so that the first direction D1 is oriented in a CW direction relative to the direction normal to the first incident surface 615, and the second direction D2 is oriented in the CW direction relative to the direction normal to the second incident surface 315.

In Modification 3, the first diffraction element 61 and the second diffraction element 31 are arranged so that the first direction D1 is oriented in the CW direction relative to the direction normal to the first incident surface 615, and the second direction D2 is oriented in a CCW direction relative to the direction normal to the second incident surface 315.

That is, arrangement of the second diffraction element 31 and the first diffraction element 61 is different depending on whether the sum of the number of reflections of light and the number of times of generating intermediate images between the second diffraction element 31 and the first diffraction element 61 is an even number or an odd number.

Specifically, when the sum of the number of reflections of the light and the number of times of generating intermediate images is an even number (Embodiment 1), the second diffraction element 31 and the first diffraction element 61 are arranged so that, as seen in a normal direction (plan view direction in FIG. 9) of an imaginary plane including a line normal to the first incident surface 615 and a line normal to the second incident surface 315 therein, the first direction D1 relative to the direction normal to the first incident surface 615, and the second direction D2 relative to the direction normal to the second incident surface 315 are oriented in the same direction (CW direction).

In contrast, when the sum of the number of reflections of the light and the number of times of generating intermediate images is an odd number (Modification 3), the second diffraction element 31 and the first diffraction element 61 are arranged so that, as viewed in the direction normal to an imaginary plane (plan view direction in FIG. 9), the first direction D1 and the second direction D2 are oriented in the opposite directions (CW direction and CCW direction).

Thus, the image light L0 having a spectrum width is deflected and dispersed into rays of respective wavelengths by the second diffraction element 31, is focused for each wavelength by the first diffraction element 61, and then enters the observer's eye as substantially parallel rays.

In Modification 3, one mode in which the mirror M2 is added between the first diffraction element 61 and the second diffraction element 31 has been described, but addition or removal of an optical element is not limited to the above description. For example, the addition or removal of an optical element lens can include addition of another lens or mirror and removal of a mirror.

Even in such a case, the orientations of the first direction D1 relative to the direction normal to the first incident surface 615 and the second direction D2 relative to the direction normal to the second incident surface 315 are preferably configured similarly to those in the above examples, depending on whether the sum of the number of reflections of the light and the number of times of generating intermediate images between the second diffraction element 31 and the first diffraction element 61 is an even number or an odd number.

Functions and Effects

As described above, according to Modification 3, even when an optical element such as a mirror or a lens is added or removed in accordance with a display performance, a size, design, or the like, an image with less reduction in resolution can be displayed with image light L0 having a spectrum width as described in Embodiment 1, and the image display device 100 can have an improved degree of freedom in design and arrangement.

The entire disclosure of Japanese Patent Application No. 2016-232194, filed Nov. 30, 2016 is expressly incorporated by reference herein.

What is claimed is:

1. An image display device comprising:
an image light generation unit configured to generate and emit image light;
a projection system optical unit configured to project the image light;
a correction system optical unit configured to correct aberrations of the image light;
a first diffraction element configured to deflect the image light incident on a first incident surface; and
a second diffraction element configured to deflect the image light incident on a second incident surface, wherein
the projection system optical unit, the second diffraction element, the correction system optical unit, and the first diffraction element are arranged in this order in a direction of the image light emitted from the image light generation unit, and
the image light, which is incident on the second incident surface through the projection system optical unit and deflected and dispersed into rays of respective wavelengths by the second diffraction element, is incident on the first incident surface through the correction system optical unit and focused by being deflected by the first diffraction element.

2. The image display device according to claim 1, wherein the first incident surface and the second incident surface have a shape in which a center portion has a curved concave shape relative to a peripheral portion in an incident direction of the image light.

3. The image display device according to claim 1, wherein the first diffraction element and the second diffraction element include a reflective volume holographic element.

4. The image display device according to claim 1, wherein the first diffraction element and the second diffraction element are provided with plural kinds of interference fringes having different pitches.

5. The image display device according to claim 1, wherein
the first diffraction element is an element having a maximum diffraction efficiency in a first direction upon incidence of light in a direction normal to the first incident surface,
the second diffraction element is an element having a maximum diffraction efficiency in a second direction upon incidence of light in a direction normal to the second incident surface, and
when a sum of the number of reflections of light and a number of times of generating intermediate images between the second diffraction element and the first diffraction element is an even number, the first diffraction element and the second diffraction element are arranged to have the first direction relative to a direction normal to the first incident surface and the second direction relative to a direction normal to the second incident surface which are oriented in the same direction, as viewed in a direction normal to an imaginary plane including a line normal to the first incident surface and a line normal to the second incident surface, and
when the sum of the number of reflections of light and the number of times of generating intermediate images between the second diffraction element and the first diffraction element is an odd number, the first diffraction element and the second diffraction element are arranged to have the first direction relative to a direction normal to the first incident surface and the second direction relative to a direction normal to the second incident surface which are oriented in different directions, as viewed in a direction normal to an imaginary plane including the line normal to the first incident surface and the line normal to the second incident surface.

6. The image display device according to claim 1, wherein the image light generation unit includes an organic electroluminescence display element.

7. The image display device according to claim 1, wherein the image light generation unit includes an illumination light source and a liquid crystal display element.

8. A light guiding device comprising:
a projection system optical unit configured to project image light;
a correction system optical unit configured to correct aberrations of the image light;
a first diffraction element configured to deflect the image light incident on a first incident surface; and
a second diffraction element configured to deflect the image light incident on a second incident surface, wherein
the projection system optical unit, the second diffraction element, the correction system optical unit, and the first diffraction element are arranged in this order in a direction of the image light projected from the projection system optical unit, and
the image light, which is incident on the second incident surface through the projection system optical unit and deflected and dispersed into rays of respective wavelengths by the second diffraction element, is incident on the first incident surface through the correction system optical unit, and focused by being deflected by the first diffraction element.

* * * * *